(12) United States Patent
Vassilieva et al.

(10) Patent No.: US 8,989,595 B2
(45) Date of Patent: Mar. 24, 2015

(54) MITIGATION OF OPTICAL SIGNAL TO NOISE RATIO DEGRADATION ARISING FROM POLARIZATION DEPENDENT LOSS

(71) Applicant: Fujitsu Limited, Kawasaki-shi, Kanagawa (JP)

(72) Inventors: Olga Vassilieva, Plano, TX (US); Inwoong Kim, Allen, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 94 days.

(21) Appl. No.: 13/921,819

(22) Filed: Jun. 19, 2013

(65) Prior Publication Data

US 2014/0376907 A1    Dec. 25, 2014

(51) Int. Cl.
*H04B 10/00* (2013.01)
*H04B 10/2507* (2013.01)
*H04B 10/077* (2013.01)

(52) U.S. Cl.
CPC ........ *H04B 10/2507* (2013.01); *H04B 10/0775* (2013.01)
USPC .............................. 398/158; 398/141; 398/26

(58) Field of Classification Search
USPC .................................... 398/140–141, 158, 26
See application file for complete search history.

(56) References Cited

U.S. PATENT DOCUMENTS

| | | | | |
|---|---|---|---|---|
| 5,969,840 | A * | 10/1999 | Roberts | 398/32 |
| 6,219,162 | B1 * | 4/2001 | Barnard et al. | 398/9 |
| 6,549,331 | B2 * | 4/2003 | Walker et al. | 359/344 |
| 7,149,407 | B1 * | 12/2006 | Doerr et al. | 385/147 |
| 7,206,517 | B1 * | 4/2007 | Yu et al. | 398/152 |
| 7,450,298 | B2 * | 11/2008 | Watanabe | 359/333 |
| 7,835,643 | B2 * | 11/2010 | Futami et al. | 398/25 |
| 8,073,326 | B2 * | 12/2011 | Yan et al. | 398/30 |
| 8,369,704 | B2 | 2/2013 | Bardalai | |
| 8,705,167 | B2 * | 4/2014 | Akasaka | 359/341.4 |
| 2002/0054648 | A1 * | 5/2002 | Krummrich et al. | 375/295 |
| 2003/0058494 | A1 * | 3/2003 | Roberts et al. | 359/115 |
| 2003/0161631 | A1 * | 8/2003 | Margalit | 398/33 |
| 2004/0004755 | A1 * | 1/2004 | Roberts et al. | 359/337 |
| 2004/0208618 | A1 * | 10/2004 | Roberts et al. | 398/158 |
| 2005/0002099 | A1 * | 1/2005 | He et al. | 359/494 |
| 2005/0213966 | A1 * | 9/2005 | Chown et al. | 398/27 |
| 2005/0226632 | A1 * | 10/2005 | Alleston et al. | 398/152 |
| 2009/0087194 | A1 * | 4/2009 | Nakashima et al. | 398/158 |
| 2010/0111530 | A1 * | 5/2010 | Shen et al. | 398/65 |
| 2010/0202777 | A1 * | 8/2010 | Liu et al. | 398/83 |
| 2010/0322632 | A1 * | 12/2010 | Way | 398/79 |
| 2011/0255874 | A1 * | 10/2011 | Watanabe | 398/178 |
| 2012/0063781 | A1 * | 3/2012 | Vassilieva et al. | 398/65 |
| 2012/0063783 | A1 * | 3/2012 | Vassilieva et al. | 398/81 |
| 2012/0114330 | A1 * | 5/2012 | Bruno et al. | 398/26 |
| 2013/0004162 | A1 * | 1/2013 | Osaka | 398/34 |
| 2014/0023362 | A1 * | 1/2014 | Vassilieva et al. | 398/26 |
| 2014/0226971 | A1 * | 8/2014 | Vassilieva et al. | 398/25 |

OTHER PUBLICATIONS

Toa et al.; "A Fast Method to Simulate the PDL Impact on Dual-Polarization Coherent Systems"; IEEE Photonics Technology Letters, vol. 21, No. 24; pp. 3, 2009.

* cited by examiner

*Primary Examiner* — Agustin Bello
(74) *Attorney, Agent, or Firm* — Baker Botts L.L.P.

(57) ABSTRACT

Methods and systems for mitigating degradation of an optical signal-to-noise ratio (OSNR) induced by polarization dependent loss (PDL) in an optical network include determining an increase in power ($\Delta P$) corresponding to a PDL-induced decrease in OSNR for a given channel being transmitted over an optical signal transmission path. The increase in power ($\Delta P$) may be adjusted for at least some of the network nodes in the optical signal transmission path. At certain network nodes, the increase in power ($\Delta P$) may be realized with a combination of attenuation and gain.

20 Claims, 5 Drawing Sheets

MITIGATION OF OPTICAL SIGNAL TO NOISE RATIO DEGRADATION ARISING FROM POLARIZATION DEPENDENT LOSS

BACKGROUND

1. Field of the Disclosure

The present disclosure relates generally to optical communication networks and, more particularly, to a system and method for mitigating degradation of optical signal-to-noise ratio induced by polarization dependent loss (PDL) in dual-polarization optical systems.

2. Description of the Related Art

Telecommunications systems, cable television systems and data communication networks use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, couplers, etc. configured to perform various operations within the network.

However, each of these network subsystems may also introduce polarization dependent effects on the optical signals traveling through the network. These effects may cause the different polarization components of the optical signals to experience different signal degradation due to polarization dependent loss (PDL). For example, PDL may cause an imbalance in the optical signal-to-noise ratio (OSNR) between polarization of the optical signal, such that one polarization component exhibits a degraded OSNR at a receiver compared to another polarization component. Furthermore, depending on the symbols transmitted, cross talk among polarization components due to PDL may result in intensity variations that are observed as nonlinear phase noise.

SUMMARY

In one aspect, a disclosed method for mitigating optical signal-to-noise ratio degradation in an optical network includes identifying an optical signal transmission path carrying an optical channel over the optical network. The optical signal transmission path may include N number of network nodes. The method may include determining an increase in optical power ($\Delta P$) for the optical channel corresponding to a decrease in an optical signal-to-noise ratio (OSNR) for the optical channel, and calculating a node power increase ($\Delta P_{node}$) for each respective network node for the optical channel based on the increase in optical power ($\Delta P$). The decrease in the optical signal-to-noise ratio may be a result of polarization dependent loss (PDL) along the optical signal transmission path. The method may include sending instructions to at least some of the N number of network nodes to adjust an in-line power level for the optical channel by the node power increase ($\Delta P_{node}$), respectively. The optical channel may have a dual polarization.

Additional disclosed aspects for mitigating optical signal-to-noise ratio degradation in an optical network include a system comprising a processor and non-transitory computer readable memory media storing processor-executable instructions, as well as a control plane system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
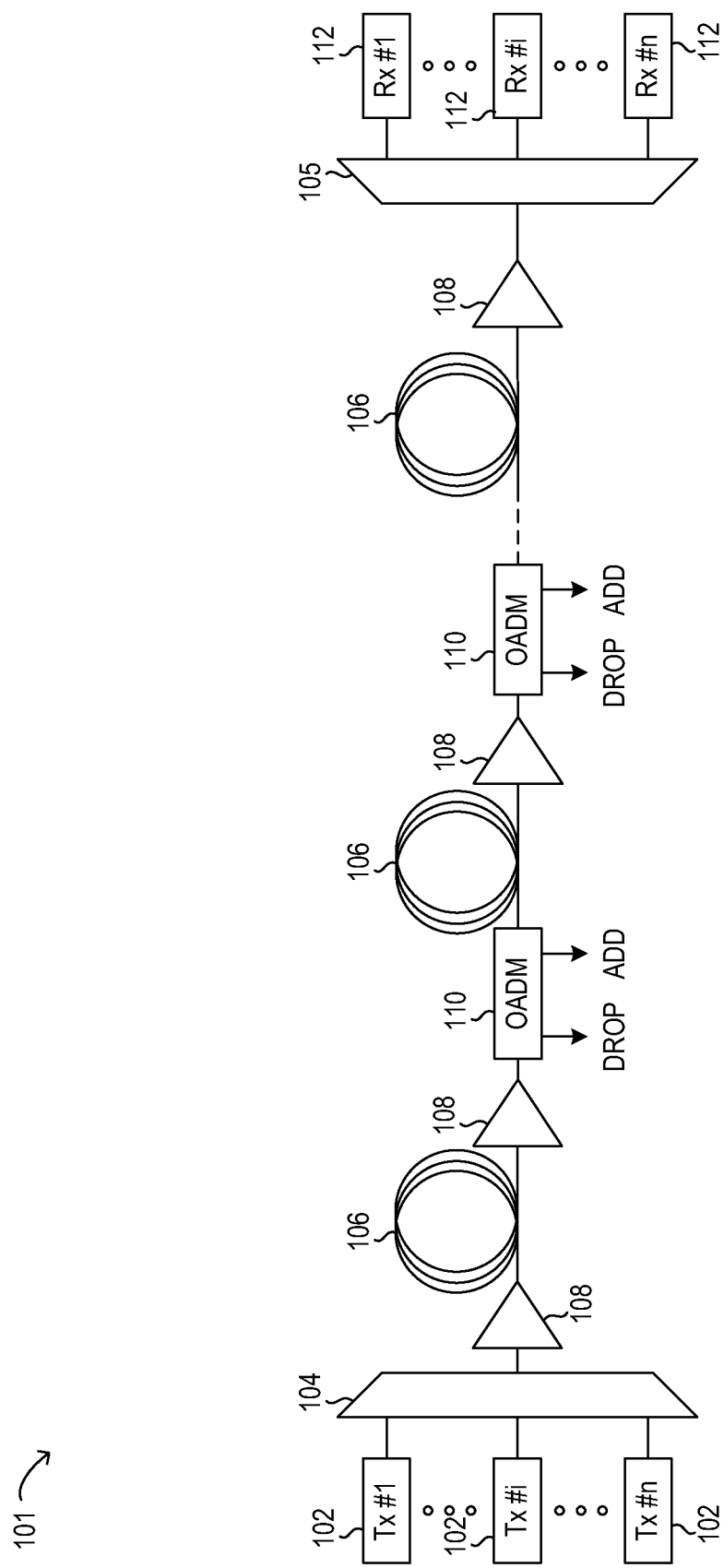
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 illustrates an example embodiment of optical transmission network 101. Optical transmission network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA).

OADMs 110 may be coupled to network 101 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Network 101 may also include one or more demultiplexers 105 at one or more destinations of network 101. Demultiplexer 105 may comprise any system apparatus or device that may act as a demultiplexer by splitting a single WDM signal into its individual channels. For example, network 101 may transmit and carry a forty channel DWDM signal. Demultiplexer 105 may divide the single, forty channel DWDM signal into forty separate signals according to the forty different channels.

In certain embodiments of network 101, OADM 110 may represent a reconfigurable OADM (ROADM) that is capable of adding or dropping individual or multiple wavelengths of a WDM signal carrying data channels to be added or dropped in the optical domain, for example, using a wavelength selective switch (WSS).

Network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network.

Optical networks, such as network 101, may further employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave, or simple, a carrier. The information may be conveyed by modulating the phase of the signal itself using differential phase-shift keying ("DPSK"). In QAM, the information carried by the optical signal may be conveyed by modulating both the amplitude and phase of the carrier wave. PSK may be considered a subset of QAM, wherein the amplitude of the carrier waves is maintained as a constant.

In an optical communications network, such as network 101, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to network 101 without departing from the scope of the disclosure. For example, network 101 may include more or fewer elements than those depicted. Additionally network 101 may include additional elements not expressly shown, such as a dispersion compensation module. Also, as mentioned above, although depicted as a point-to-point network, network 101 may comprise any suitable network for transmitting optical signals such as a ring or mesh network.

As discussed above, the amount of information that may be transmitted over an optical network may vary with the number of optical channels coded with information and multiplexed into one signal. Accordingly, an optical signal employing WDM may carry more information than an optical signal carrying information over solely one channel. An optical signal employing DWDM may carry even more information. Besides the number of channels carried, another factor that affects how much information can be transmitted over an optical network may be the bit rate of transmission. The greater the bit rate, the more information may be transmitted.

Polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal. The term "linear polarization" may generally refer to a single direction of the orientation of the electric field vector. Generally, an arbitrary linearly polarized wave can be resolved into two independent orthogonal components labeled X and Y, which are in phase or out of phase with each other. For example, in polarization multiplexed transmission, an optical beam created by a laser may be highly linearly polarized. The beam may be divided by a polarization beam splitter according to the X-polarization component of the beam and the Y-polarization component of the beam. Upon being split, the X-polarization component may be aligned with a horizontal axis and the Y-polarization component may be aligned with a vertical axis of the beam. It is understood that the terms "horizontal" polarization and "vertical" polarization (also referred to as X-polarization and Y-polarization) are merely used to denote a frame of reference for descriptive purposes, and do not relate to any particular polarization orientation.

Following splitting of the beam into the X- and Y-polarization components, information may be modulated onto both beams. Following modulation, both beams may be combined by a polarization beam combiner such that the combined beam comprises an optical signal with two polarization components (e.g., an X-polarization component and a Y-polarization component) with information modulated onto each polarization component. Accordingly, by modulating information onto both the X-polarization component and Y-polarization component of the signal, the amount of information that may be carried by the channel associated with the signal over any given time may increase (i.e., the bit rate of the channel may be increased).

In the present disclosure, it is understood that as signals travel through the network, the polarization of the signals may rotate with respect to the frame of reference. Consequently, the modulated X- and Y-polarization components may also be rotated such that the components are no longer aligned with the horizontal axis and the vertical axis of the frame of reference. However, the terms "X-polarization" and "Y-polarization" of the signal may still be used to denote the polarization components with information modulated thereon even if the modulated X- and Y-polarization components are no longer oriented with the horizontal and vertical axes of the frame of reference.

In operation of network 101, the optical signals may be dual polarized, with orthogonal polarization components in the X and Y axes. In various embodiments of network 101, certain components of elements of network 101 may exhibit polarization dependent loss (PDL), which may result in degradation of optical signal-to-noise ratio (OSNR) of the transmitted optical signal, as well as nonlinear phase noise resulting from PDL-induced cross talk between the two orthogonal polarization components. Components of network 101 that may contribute to PDL (referred to herein individually as a "PDL tributary") include multiplexer 104, amplifier 108, OADM 110, as well as other components (not shown), including dispersion compensators, wavelength selective switches, couplers, etc. (see International Telecommunication Union ITU-T G.680). The polarization dependent loss may be observed for different types of modulation schemes used for transmitting optical signals. Furthermore, in addition to polarization dependent loss, amplifiers in network 101 may exhibit amplified spontaneous emission (ASE) noise which may also contribute to OSNR degradation.

Accordingly, a simplified model for noise within network 101 may include defining N number of network nodes having both ASE and PDL contributions to noise. The N nodes may represent successive elements in an optical signal transmission path transmitting dual polarization signals. It has been observed that a first PDL element in a first node may make a much greater contribution to the total noise observed after node N than the Nth PDL element. Also, ASE noise from the N-th (i.e., last) amplifier along an optical signal transmission path may contribute more to the total noise than ASE noise from the first amplifier (see Z. Tao et al., "A fast method to simulate the PDL impact on dual-polarization coherent systems", Photonics Technology Letters, Vol 21, No 24, 2009.) Therefore, increase in OSNR along the optical signal transmission path or a reduction in noise at the N-th amplifier may be desirable for recovery of the loss of PDL-induced OSNR. Since each optical amplifier has a specific amount of noise figure (NF) associated with its corresponding ASE noise, reducing the ASE noise of optical amplifiers may not be possible. Therefore, an increase of OSNR along the optical signal transmission path is a desirable option.

As will be described in further detail herein, the novel methods and systems disclosed herein for mitigating polarization dependent loss by pre-emphasizing power levels in network component along an optical signal transmission path have been invented to overcome such disadvantages and enable increase in OSNR in dual polarization optical signals. Specifically, network 101 may control input power levels at each network node to mitigate polarization dependent loss when a dual polarization optical signal is transmitted. The methods and systems disclosed herein may be associated with certain advantages compared to other techniques for mitigating polarization dependent loss (PDL). For example, the methods and systems described herein may be implemented in existing network components, such as in-line amplifiers and wavelength selective switches (WSS), while information about the optical signal transmission path may be obtained from a Control Plane (CP).

Figure 2A:
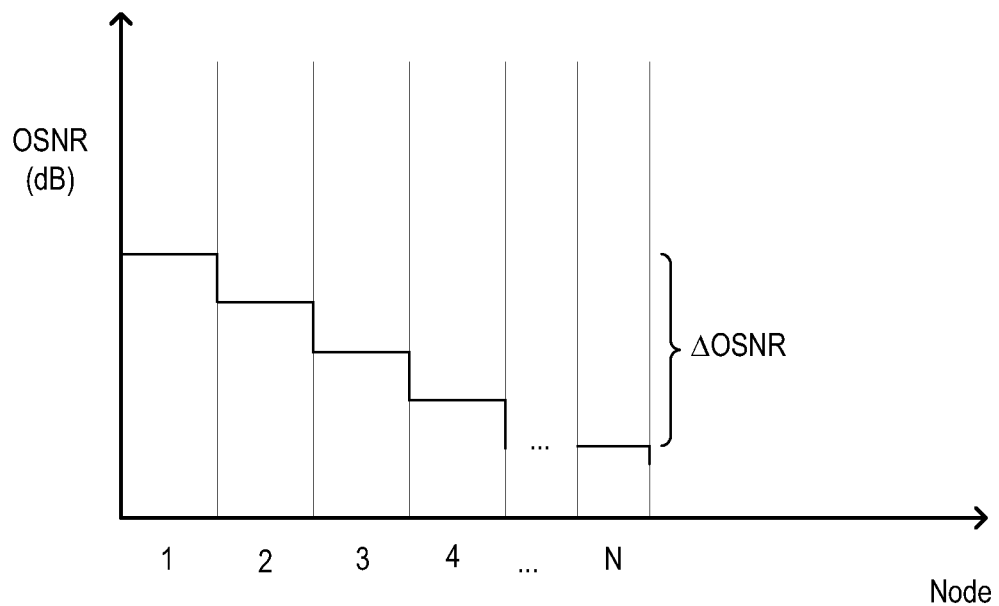
FIG. 2A is a plot showing a decrease in optical signal-to-noise ratio (OSNR) versus network node.

Turning now to FIG. 2A, a plot showing OSNR reduction for N number of nodes in an optical network due to polarization dependent loss (PDL) is depicted. In FIG. 2A, it may be assumed that the OSNR reduction is observed when signal power level is kept constant from node to node, where a network node includes a power-regulating component, such as an in-line amplifier, whose gain may be, for example, set to 0 dBm per channel fiber input power. In such a cascade of optical amplifiers, when each optical amplifier exhibits the same NF, it may be observed that the total OSNR is given by Equation 1 below.

$$\text{OSNR}_{TOTAL}(\text{dB}) = P_{IN}(\text{dB}) - \text{NF}(\text{dB}) - 10 \log N - 10 \log h\nu\Delta f \quad \text{Equation (1)}$$

In Equation 1, $P_{IN}$ is the input fiber power, NF is the noise figure of the amplification system, N is the number of nodes, h is Planck's constant, ν is the optical frequency, and $\Delta f$ is the optical measurement bandwidth. From Equation 1, it may be observed that total OSNR is proportional to the fiber input power, $P_{IN}$. In addition to OSNR reduction due to a cascade of optical amplifiers, OSNR reduction due to a cascade of PDL tributary elements may be observed. In FIG. 2A, it is shown that OSNR may be reduced for each node N in the optical chain of elements representing the optical signal transmission path, for a total reduction in OSNR given by ΔOSNR. This OSNR reduction (ΔOSNR) may represent an adverse and undesired impact of PDL on the optical signal.

Figure 2B:
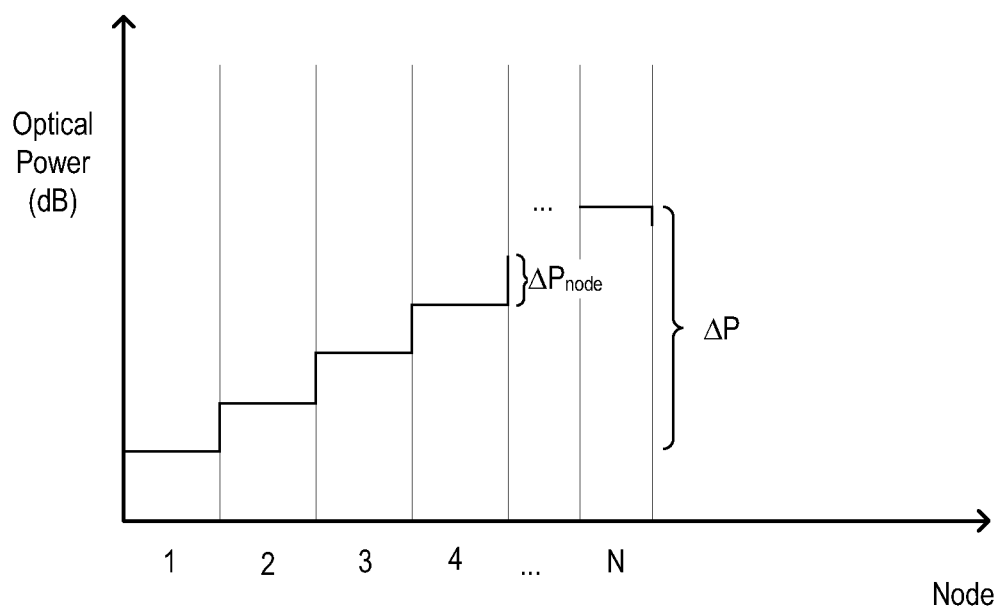
FIG. 2B is a plot showing an increase in optical power ($\Delta P$) versus network node.

Turning now to FIG. 2B, a plot showing power increase for N number of nodes in an optical network due is depicted. In FIG. 2B, the overall power increase over the N nodes may be given by ΔP, while a power increase for an arbitrary node may be given by $\Delta P_{node}$. As described herein, a novel method for mitigating PDL-induced OSNR degradation in an optical network may include setting an additional increase in power $\Delta P$ equal to $\Delta OSNR$ (see FIG. 2A). In one embodiment, the increase in power $\Delta P$ may be distributed across the N nodes of the optical network. As shown in FIG. 2B, the increase in power $\Delta P$ may be uniformly distributed across the N nodes, such that each node increases power by an amount equal to a node power increase $\Delta P_n$, given by Equation (2).

$$\Delta P_{node} = \Delta P_n = \Delta P/N \qquad \text{Equation (2)}$$

In given embodiments, for a given optical signal transmission path over N number of nodes, it may be observed that a value for $\Delta P$ may be relatively small, such that the node power increase $\Delta P_{node}$, when evenly distributed across all nodes N, is also relatively small, and may be difficult to adjust with a desired degree of certainty on the physical equipment present at one or more of the N nodes. In one embodiment (not shown in FIG. 2B), power adjustment may be performed at every M-th node instead of every node N, where M is greater than one (1) and less than N. In such a case, the power increase at each M-th node of the N number of nodes may be given by Equation 3a.

$$\Delta P_{node} = \Delta P_m = \Delta P * M/N \qquad \text{Equation (3a)}$$

In the case corresponding to Equation 3a, the input power for each of a remaining (N−M) number of nodes may not be increased or may be kept at, for example, either at 0 dBm per channel fiber input power or at a previous node power setting.

In other embodiments, the increase in power $\Delta P$ may be non-uniformly distributed across the N nodes. For example, the increase in power $\Delta P$ may be divided by K number of nodes, where K is greater than or equal to one (1) and less than N. In various embodiments (not shown in FIG. 2B), the K nodes may be arbitrarily selected among the N nodes, or may be selected according to defined criteria. The increase in power at each of the K nodes, $\Delta P_k$, may be given by Equation 3b.

$$\Delta P_{node} = \Delta P_k = \Delta P/K \qquad \text{Equation (3b)}$$

In the case corresponding to Equation 3b, the input power for each of a remaining (N−K) number of nodes may not be increased or may be kept at, for example, either at 0 dBm per channel fiber input power or at a previous node power setting.

In various embodiments, certain nodes may include a wavelength selective switch (WSS) with wavelength-specific attenuation capability in addition to an in-line amplifier (not shown). In such cases, the node power increase $\Delta P_{node}$ per wavelength at an arbitrary node N may be given by Equation 4.

$$\Delta P_{node} = \Delta P_{WSS} + \Delta P_{AMP} \qquad \text{Equation (4)}$$

In Equation 4, $\Delta P_{WSS}$ may represent an attenuation provided by a wavelength selective switch (WSS), while $\Delta P_{AMP}$ may represent a gain provided by an amplifier. It is noted that $\Delta P_{WSS}$ may be adjusted individually for each optical wavelength, while $\Delta P_{AMP}$ may represent a collective value for all wavelengths. It is further noted that the method of node power adjustment given by Equation 4 may also be used to attain very small values for $\Delta P_{node}$, for example, smaller than may be reliably adjusted using $\Delta P_{AMP}$ alone in certain instances.

In certain embodiments, the increase in power $\Delta P$ described herein may represent one of several components of power adjustment performed on various in-line nodes of an optical signal transmission path. In some embodiments, power adjustment for wavelength dependent gain ($\Delta P_{WDG}$) exhibited by optical amplifiers may be performed. In some embodiments, compensation for power variation caused by wavelength dependent loss ($\Delta P_{WDL}$) during fiber transmission may be performed. Thus, a total adjusted power per channel i may be given by Equation 5.

$$\text{Total Adjusted Power per Channel} = P_{IN}^i + \Delta P^i + \Delta P_{WDG}^i + \Delta P_{WDL}^i \qquad \text{Equation (5)}$$

In Equation 5, $P_{IN}^i$ represents the input power per channel, $\Delta P^i$ is the power adjustment per channel as described herein, $\Delta P_{WDG}^i$ is the wavelength-dependent gain per channel, and $\Delta P_{WDL}^i$ is the wavelength-dependent loss per channel.

Figure 3:
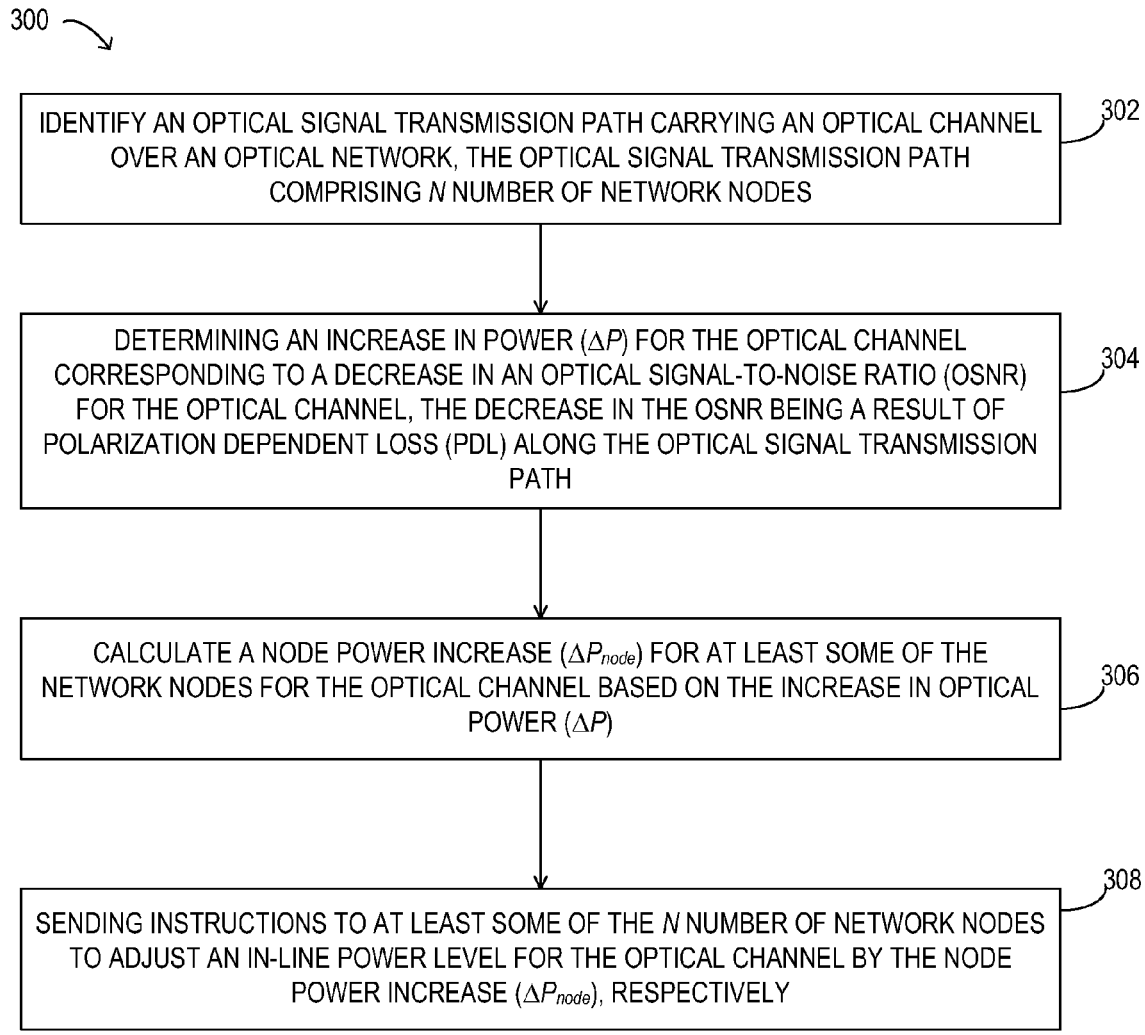
FIG. 3 is a flow chart of selected elements of a method for channel power adjustment to reduce OSNR degradation arising from polarization dependent loss (PDL)

Referring now to FIG. 3, a block diagram of selected elements of an embodiment of method 300 for channel power adjustment to reduce OSNR degradation arising from polarization dependent loss (PDL) is depicted in flowchart form. Method 300 may be performed using network 101 (see FIG. 1), for example, by using a control plane and/or an optical path computation engine included in network 101. It is noted that certain operations described in method 300 may be optional or may be rearranged in different embodiments.

In FIG. 3, method 300 may begin by identifying (operation 302) an optical signal transmission path carrying an optical channel over an optical network, the optical signal transmission path comprising N number of network nodes. An increase in power ($\Delta P$) for the optical channel corresponding to a decrease in an optical signal-to-noise ratio (OSNR) for the optical channel may be determined (operation 304), the decrease in OSNR being a result of polarization dependent loss (PDL) along the optical signal transmission path. A node power increase ($\Delta P_{node}$) for at least some of the network nodes for the optical channel may be calculated (operation 306) based on the increase in optical power ($\Delta P$). It is noted that certain values for $\Delta P_{node}$ may be, for example, either at 0 dBm per channel fiber input power or at a previous node power setting for certain nodes in various embodiments, as described previously. Instructions may be sent (operation 308) to at least some of the N number of network nodes to adjust an in-line power level for the optical channel by the node power increase ($\Delta P_{node}$), respectively.

Figure 4A:
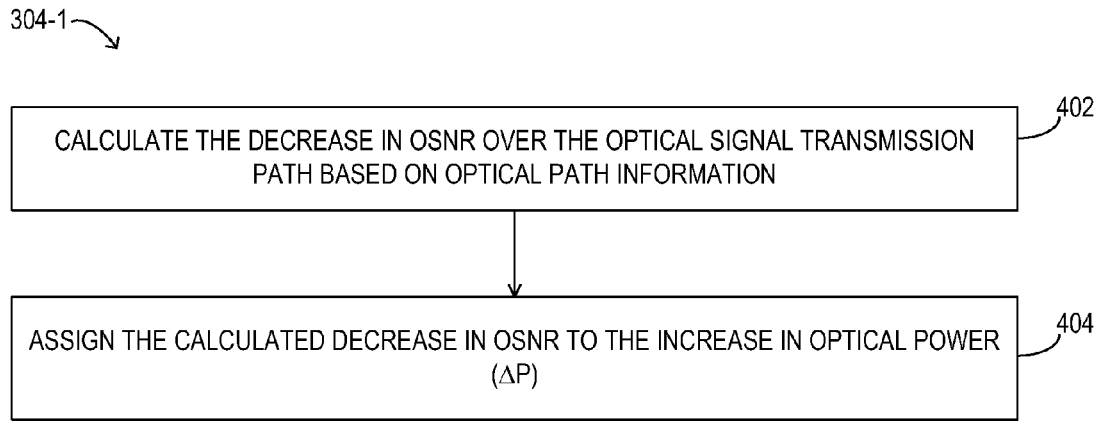
FIGS. 4A, 4B and 4C are flow chart of selected elements of methods for channel power adjustment to reduce OSNR degradation arising from polarization dependent loss (PDL)
Figure 4B:
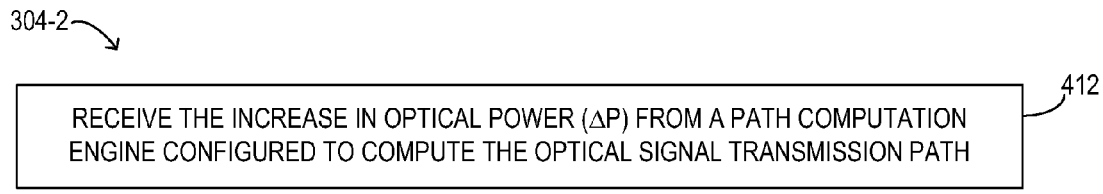
Figure 4C:
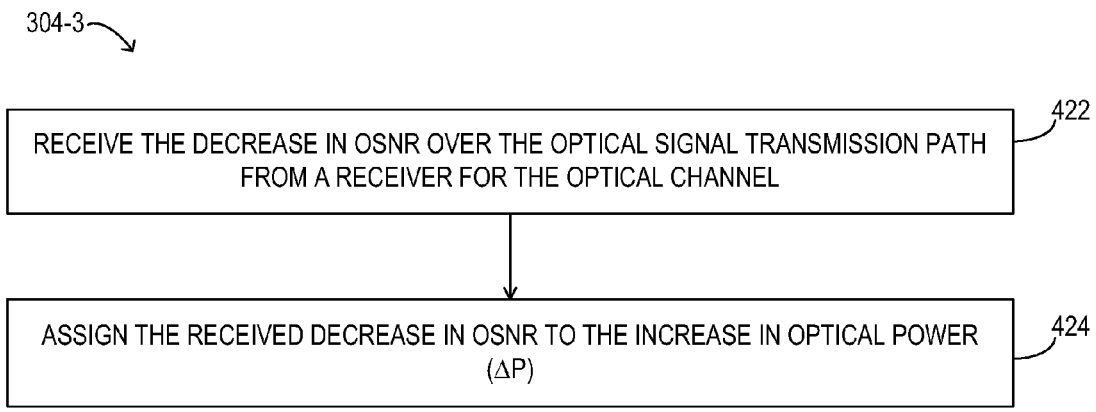

Referring now to FIGS. 4A, 4B, and 4C, block diagrams of selected elements of embodiments of method operations 304-1, 304-2, and 304-3 (see also FIG. 3) for determining and increase in optical power are depicted in flowchart form. Methods 304-1, 304-2, and 304-3 may represent different embodiments for performing method operation 304 (see FIG. 3).

In FIG. 4A, method 304-1 may begin by calculating (operation 402) the decrease in OSNR over the optical signal transmission path based on optical path information (i.e., a number of nodes, a number of PDL tributaries per node, respective PDL values for the PDL tributaries, and a decrease in OSNR for each of the PDL tributaries). The optical path information may be obtained using the control plane and/or a path computation engine (see also FIG. 5). The calculated decrease in OSNR may be assigned (operation 404) to the increase in optical power ($\Delta P$).

Figure 5:
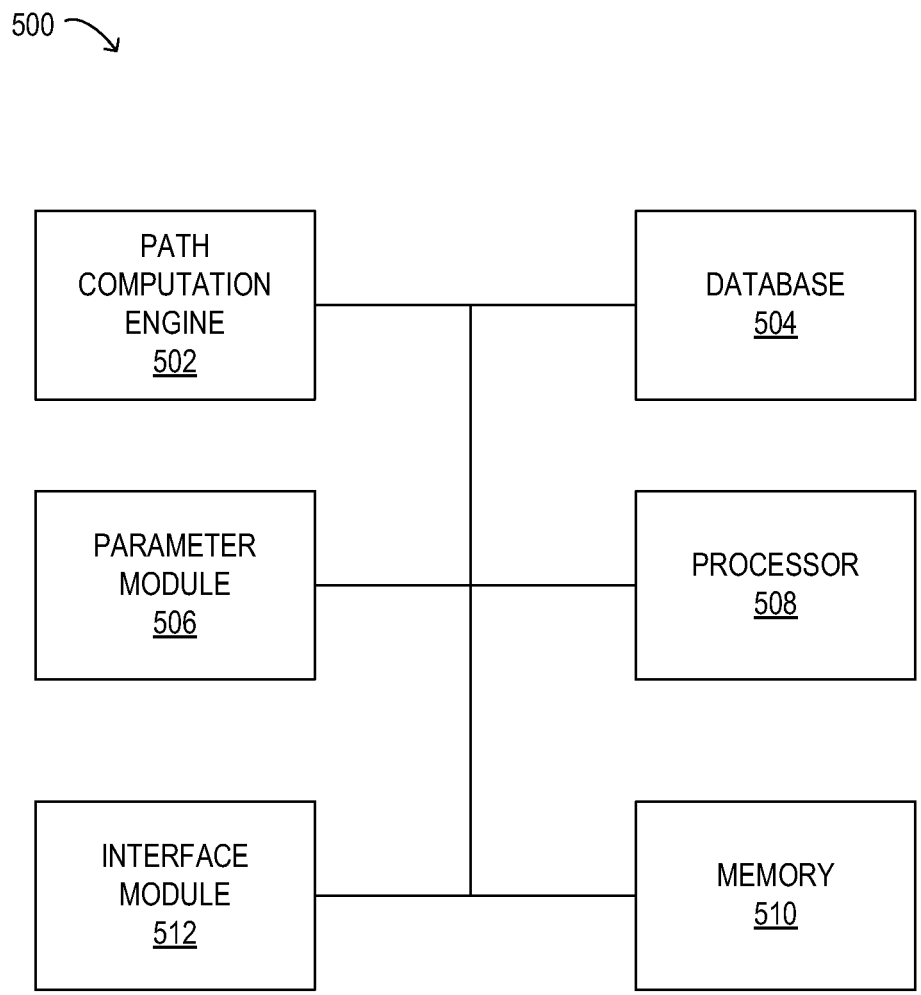
FIG. 5 is a block diagram of selected elements of an embodiment of a system for obtaining optical path information of an optical signal transmission path.

In FIG. 4B, method 304-2 may comprise receiving (operation 412) the increase in optical power ($\Delta P$) from a path computation engine configured to compute the optical signal transmission path (see also FIG. 5).

In FIG. 4C, method 304-3 may begin by receiving (operation 422) the decrease in OSNR over the optical signal transmission path from a receiver for the optical channel. The received decrease in OSNR may be assigned (operation 424) to the increase in optical power ($\Delta P$).

Turning now to FIG. 5 a block diagram of selected elements of an embodiment of example system 500 for obtaining optical path information of an optical signal transmission path, in accordance with certain embodiments of the present disclosure. System 500 may include path computation engine 502, database 504, parameter module 506, processor 508, memory 510, and interface module 512.

In some embodiments, interface module 512 may be configured to receive data concerning an optical signal transmission path in an optical network. That is, interface module 512 may receive data about the optical signal transmission path, such as, fiber type; fiber length; number and/or type of components, such as a dispersion compensation module, ADM, amplifier, multiplexer, or demultiplexer, in the optical signal transmission path; data rate; modulation format of the data; input power of the optical signal; number of signal carrying wavelengths, which may be referred to herein as channels; channel spacing; traffic demand; and/or network topology, among others. For example, interface module 512 may enable system 500 to communicate with various network devices (not shown) along the optical signal transmission path to receive the data concerning the optical signal transmission path. Furthermore, in accordance with the methods disclosed herein, interface module 512 may enable system 500 to send instructions to the N number of nodes in the optical signal transmission path to adjust a power level at desired nodes where applicable, as described previously.

As an illustrative example, in some embodiments, interface module 512 may be configured to interface with a person (i.e., a user) and receive data about the optical signal transmission path. For example, interface module 512 may also include and/or may be coupled to one or more input devices and/or output devices to facilitate receiving data about the optical signal transmission path from the user and/or outputting results to the user. The one or more input and/or output devices (not shown) may include, but are not limited to, a keyboard, a mouse, a touchpad, a microphone, a display, a touchscreen display, an audio speaker, or the like. Alternately or additionally, interface module 512 may be configured to receive data about the optical signal transmission path from a device such as a computing device (not shown).

In some embodiments, parameter module 506 may be configured to provide parameters concerning the optical signal transmission path based on the data received about the optical signal transmission path by interface module 512. As an illustrative example, parameter module 506 may provide parameters regarding the fiber type, such as a dispersion map for the fiber type and other optical properties of the fiber type. As another example, parameter module 506 may provide parameters concerning the components in the optical signal transmission path. For example, the parameters of the components provided by parameter module 506 may include the PDL of the components and other optical properties of the components. In some embodiments, parameter module 506 may provide some of or all of the optical properties of the components in the optical signal transmission path that may be used by path computation engine 502.

Path computation engine 502 may be configured to use the parameters from the parameter module 506 and the data from interface module 512 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, path computation engine 502 may consider the interplay between the transmission degradation factors. In various embodiments, path computation engine 502 may generate values for specific transmission degradation factors. For example, for each PDL tributary and/or each of the N number of nodes along the optical signal transmission path, path computation engine 502 may calculate a PDL value, and/or other values for various transmission degradation factors.

In some embodiments, path computation engine 502 may provide the accumulated amount of each transmission degradation factor for the optical signal transmission path. Alternately or additionally, path computation engine 502 may provide the OSNR penalty due to each transmission degradation factor. Alternately or additionally, path computation engine 502 may provide the OSNR penalty due to a combination of one or more transmission degradation factors. Alternately or additionally, path computation engine 502 may provide the total OSNR of the optical signal transmission path. The total OSNR may be the optimal OSNR that may be achieved along the optical signal transmission path without any degradation. Alternatively or additionally, path computation engine 502 may determine OSNR degradation along the optical signal transmission path, for example, when OSNR degradation is due to PDL. Alternatively or additionally, path computation engine 502 may report the OSNR degradation as an increase in optical power ($\Delta P$) that corresponds to the OSNR degradation (see also FIGS. 2A and 2B). In some embodiments, path computation engine 502 may provide additional information regarding the optical signal transmission path.

Database 504 may be configured to store the data produced by path computation engine 502 about the optical signal transmission path. Processor 508 may be configured to execute computer instructions that cause the system 500 to perform the functions and operations described herein. The computer instructions may be loaded into the memory 510 for execution by processor 508 and/or data generated, received, or operated on during performance of the functions and operations described herein may be at least temporarily stored in memory 510.

To accurately determine some of the transmission characteristics of the optical signal transmission path due to the randomly rotating states of polarization of an optical signal in the optical signal transmission path, path computation engine 502 may run a large number (e.g., thousands) of iterations using varying states of polarization of the optical signal to determine the transmission characteristics of the optical signal transmission path.

As described in detail above, methods and systems for mitigating degradation of an optical signal-to-noise ratio (OSNR) polarization dependent loss (PDL) in an optical network include determining an increase in power ($\Delta P$) corresponding to a decrease in OSNR for a given channel being transmitted over an optical signal transmission path. The increase in power ($\Delta P$) may be adjusted for at least some of the network nodes in the optical signal transmission path. At certain network nodes, the increase in power ($\Delta P$) may be realized with a combination of attenuation and gain.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for mitigating optical signal-to-noise ratio degradation in an optical network, comprising:
   identifying an optical signal transmission path carrying an optical channel over the optical network, wherein the optical signal transmission path comprises N number of network nodes;
   determining an increase in optical power ($\Delta P$) for the optical channel corresponding to a decrease in an optical signal-to-noise ratio (OSNR) for the optical channel, the decrease in the optical signal-to-noise ratio being a result of polarization dependent loss (PDL) along the optical signal transmission path;
   calculating a node power increase ($\Delta P_{node}$) for each respective network node for the optical channel based on the increase in optical power ($\Delta P$); and
   sending instructions to at least some of the N number of network nodes to adjust an in-line power level for the optical channel by the node power increase ($\Delta P_{node}$), respectively,
   wherein the optical channel has a dual polarization.

2. The method of claim 1, wherein determining the increase in optical power ($\Delta P$) for the optical channel further comprises:
   calculating the decrease in the optical signal-to-noise ratio (OSNR) over the optical signal transmission path based on optical path information, including:
   a value for N;
   a number of PDL tributary elements included in the N number of network nodes;
   a PDL value for each of the PDL tributary elements; and
   a respective decrease in optical signal-to-noise ratio (OSNR) for each of the PDL tributary elements; and
   assigning the calculated decrease in the optical signal-to-noise ratio (OSNR) to the increase in optical power ($\Delta P$).

3. The method of claim 1, wherein determining the increase in optical power ($\Delta P$) for the optical channel further comprises:
   receiving the increase in optical power ($\Delta P$) from a path computation element configured to compute the optical signal transmission path.

4. The method of claim 1, wherein determining the increase in optical power ($\Delta P$) for the optical channel further comprises:
   receiving the decrease in the optical signal-to-noise ratio (OSNR) over the optical signal transmission path from a receiver for the optical channel; and
   assigning the received decrease in the optical signal-to-noise ratio (OSNR) to the increase in optical power ($\Delta P$).

5. The method of claim 1, wherein calculating the node power increase ($\Delta P_{node}$) further comprises:
   when the in-line power level is adjusted at each of the N number of nodes:
   assigning N number of nodes a first node power increase ($\Delta P_n$) given by $\Delta P_n = \Delta P/N$;

when the in-line power level is adjusted at each M-th node of the N number of nodes, wherein M is greater than 1 and less than N:
   assigning each M-th node of the N number of nodes a second node power increase ($\Delta P_m$) given by $\Delta P_m = \Delta P * M/N$; and when the in-line power level is adjusted at K number of nodes selected from the N number of nodes, wherein K is greater than or equal to 1 and less than N:
   assigning K number of nodes a third node power increase ($\Delta P_k$) given by $\Delta P_k = \Delta P/K$.

6. The method of claim 1, wherein a first network node includes a wavelength selective switch and an optical amplifier, and wherein calculating the node power increase ($\Delta P_{node}$) for the first network node comprises:
   estimating a node attenuation ($\Delta P_{WSS}$) for the wavelength selective switch;
   estimating a node amplification gain ($\Delta P_{AMP}$) for the optical amplifier; and
   calculating the node power increase for the first network node according to the equation:

$\Delta P_{node} = \Delta P_{WSS} + \Delta P_{AMP}$.

7. The method of claim 1, wherein a total power adjustment for the optical channel includes the increase in optical power ($\Delta P$) and at least one of:
   a first power adjustment for wavelength dependent gain; and
   a second power adjustment for wavelength dependent loss.

8. A system for mitigating optical signal-to-noise ratio degradation in an optical network, comprising:
   a processor configured to access non-transitory computer readable memory media, wherein the memory media store processor-executable instructions, the instructions, when executed by a processor, cause the processor to:
   identify an optical signal transmission path carrying an optical channel over the optical network, wherein the optical signal transmission path comprises N number of network nodes;
   determine an increase in optical power ($\Delta P$) for the optical channel corresponding to a decrease in an optical signal-to-noise ratio (OSNR) for the optical channel, the decrease in the optical signal-to-noise ratio being a result of polarization dependent loss (PDL) along the optical signal transmission path;
   calculate a node power increase ($\Delta P_{node}$) for each respective network node for the optical channel based on the increase in optical power ($\Delta P$); and
   send instructions to at least some of the N number of network nodes to adjust an in-line power level for the optical channel by the node power increase ($\Delta P_{node}$), respectively,
   wherein the optical channel has a dual polarization.

9. The system of claim 8, wherein the instructions to determine the increase in optical power ($\Delta P$) for the optical channel further comprise instructions to:
   calculate the decrease in the optical signal-to-noise ratio (OSNR) over the optical signal transmission path based on optical path information, including:
   a value for N;
   a number of PDL tributary elements included in the N number of network nodes;
   a PDL value for each of the PDL tributary elements; and
   a respective decrease in optical signal-to-noise ratio (OSNR) for each of the PDL tributary elements; and
   assign the calculated decrease in the optical signal-to-noise ratio (OSNR) to the increase in optical power ($\Delta P$).

10. The system of claim 8, wherein the instructions to determine the increase in optical power ($\Delta P$) for the optical channel further comprise instructions to:
    receive the increase in optical power ($\Delta P$) from a path computation element configured to compute the optical signal transmission path.

11. The system of claim 8, wherein the instructions to determine the increase in optical power (ΔP) for the optical channel further comprise instructions to:
- receive the decrease in the optical signal-to-noise ratio (OSNR) over the optical signal transmission path from a receiver for the optical channel; and
- assign the received decrease in the optical signal-to-noise ratio (OSNR) to the increase in optical power (ΔP).

12. The system of claim 8, wherein the instructions to calculate the node power increase ($\Delta P_{node}$) further comprise instructions to:
- when the in-line power level is adjusted at each of the N number of nodes:
  - assign N number of nodes a first node power increase ($\Delta P_n$) given by $\Delta P_n = \Delta P/N;$

- when the in-line power level is adjusted at each M-th node of the N number of nodes, wherein M is greater than 1 and less than N:
  - assign each M-th node of the N number of nodes a second node power increase ($\Delta P_m$) given by $\Delta P_m = \Delta P*M/N;$ and

- when the in-line power level is adjusted at K number of nodes selected from the N number of nodes, wherein K is greater than or equal to 1 and less than N:
  - assign K number of nodes a third node power increase ($\Delta P_k$) given by $\Delta P_k = \Delta P/K.$

13. The system of claim 8, wherein a first network node includes a wavelength selective switch and an optical amplifier, and wherein calculating the node power increase ($\Delta P_{node}$) for the first network node comprises:
- estimating a node attenuation ($\Delta P_{WSS}$) for the wavelength selective switch;
- estimating a node amplification gain ($\Delta P_{AMP}$) for the optical amplifier; and
- calculating the node power increase for the first network node according to the equation:

$\Delta P_{node} = \Delta P_{WSS} + \Delta P_{AMP}.$

14. A control plane system for mitigating optical signal-to-noise ratio degradation in an optical network, the control plane system configured for:
- identifying an optical signal transmission path carrying an optical channel over the optical network, wherein the optical signal transmission path comprises N number of network nodes;
- determining an increase in optical power (ΔP) for the optical channel corresponding to a decrease in an optical signal-to-noise ratio (OSNR) for the optical channel, the decrease in the optical signal-to-noise ratio being a result of polarization dependent loss (PDL) along the optical signal transmission path;
- calculating a node power increase ($\Delta P_{node}$) for each respective network node for the optical channel based on the increase in optical power (ΔP); and
- sending instructions to at least some of the N number of network nodes to adjust an in-line power level for the optical channel by the node power increase ($\Delta P_{node}$), respectively,
- wherein the optical channel has a dual polarization.

15. The control plane system of claim 14, wherein determining the increase in optical power (ΔP) for the optical channel further comprises:
- calculating the decrease in the optical signal-to-noise ratio (OSNR) over the optical signal transmission path based on optical path information, including:
  - a value for N;
  - a number of PDL tributary elements included in the N number of network nodes;
  - a PDL value for each of the PDL tributary elements; and
  - a respective decrease in optical signal-to-noise ratio (OSNR) for each of the PDL tributary elements; and
- assigning the calculated decrease in the optical signal-to-noise ratio (OSNR) to the increase in optical power (ΔP).

16. The control plane system of claim 14, wherein determining the increase in optical power (ΔP) for the optical channel further comprises:
- receiving the increase in optical power (ΔP) from a path computation element configured to compute the optical signal transmission path.

17. The control plane system of claim 14, wherein determining the increase in optical power (ΔP) for the optical channel further comprises:
- receiving the decrease in the optical signal-to-noise ratio (OSNR) over the optical signal transmission path from a receiver for the optical channel; and
- assigning the received decrease in the optical signal-to-noise ratio (OSNR) to the increase in optical power (ΔP).

18. The control plane system of claim 14, wherein calculating the node power increase ($\Delta P_{node}$) further comprises:
- when the in-line power level is adjusted at each of the N number of nodes:
  - assigning N number of nodes a first node power increase ($\Delta P_n$) given by $\Delta P_n = \Delta P/N;$

- when the in-line power level is adjusted at each M-th node of the N number of nodes, wherein M is greater than 1 and less than N:
  - assigning each M-th node of the N number of nodes a second node power increase ($\Delta P_m$) given by $\Delta P_m = \Delta P*M/N;$ and

- when the in-line power level is adjusted at K number of nodes selected from the N number of nodes, wherein K is greater than or equal to 1 and less than N:
  - assigning K number of nodes a third node power increase ($\Delta P_k$) given by $\Delta P_k = \Delta P/K.$

19. The control plane system of claim 14, wherein a first network node includes a wavelength selective switch and an optical amplifier, and wherein calculating the node power increase ($\Delta P_{node}$) for the first network node comprises:
- estimating a node attenuation ($\Delta P_{WSS}$) for the wavelength selective switch;
- estimating a node amplification gain ($\Delta P_{AMP}$) for the optical amplifier; and
- calculating the node power increase for the first network node according to the equation:

$\Delta P_{node} = \Delta P_{WSS} + \Delta P_{AMP}.$

20. The control plane system of claim 14, wherein a total power adjustment for the optical channel includes the increase in optical power (ΔP) and at least one of:
- a first power adjustment for wavelength dependent gain; and
- a second power adjustment for wavelength dependent loss.

\* \* \* \* \*